Sept. 18, 1923.

J. STURM

NONSKID DEVICE FOR AUTOMOBILE WHEELS

Filed Nov. 13, 1922

1,468,045

INVENTOR.
James Sturm,
BY Walter N. Haskell.
his ATTORNEY.

Patented Sept. 18, 1923.

1,468,045

UNITED STATES PATENT OFFICE.

JAMES STURM, OF TAMPICO, ILLINOIS.

NONSKID DEVICE FOR AUTOMOBILE WHEELS.

Application filed November 13, 1922. Serial No. 600,535.

*To all whom it may concern:*

Be it known that I, JAMES STURM, a citizen of the United States, residing at Tampico, in the county of Whiteside and State of Illinois, have invented certain new and useful Improvements in a Nonskid Device for Automobile Wheels, of which the following is a specification.

My invention pertains to a non-skid device for automobile wheels, and has for its purpose to provide a means for quick attachment or removal of anti-skid chains. It belongs to that class of such devices in which one or more short chains are supported from a plate or saddle on the inside of the rim. Some of these devices are not efficient for the reason that some of the parts thereof project beyond the rim at one or both sides thereof, and upon the wheel dropping into a rut or other narrow space these projecting parts are stripped off, rendering the device useless. In the present case it is undertaken to keep all of the parts which might be liable to injury within the space described by the edges of the rim, so that there will be no injury thereto if the wheel does drop into a rut.

In the drawings:—

Figure 1:
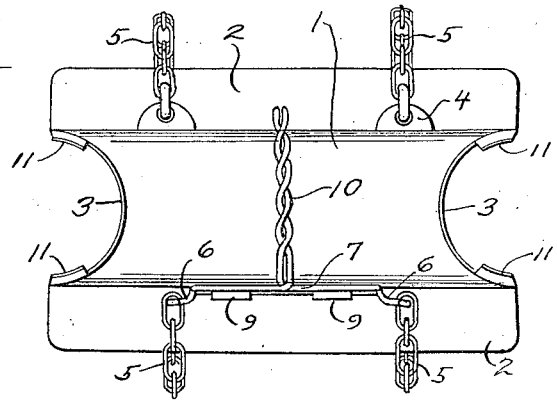
Fig. 1 is a plan view of the invention, detached.
Figure 2:
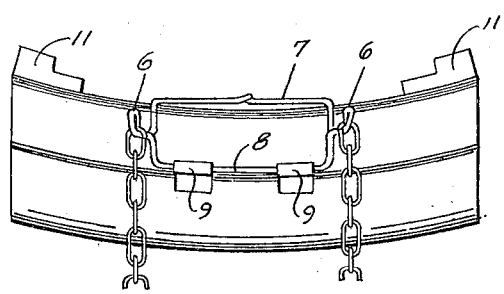
Fig. 2 is a side view thereof.
Figure 3:
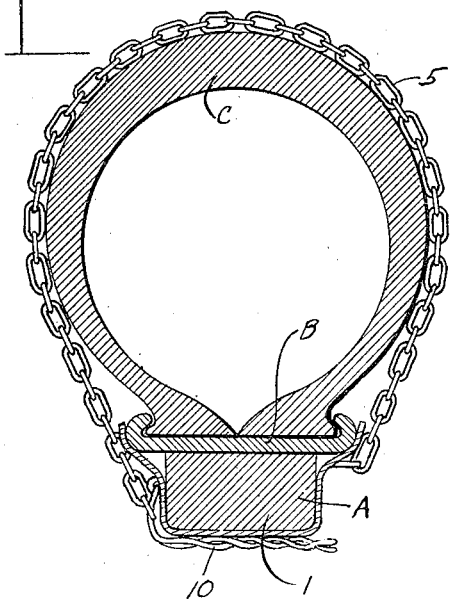
Fig. 3 is a cross-section through a rim and tire, with the device in position thereon.

The supporting plate, or saddle comprises a body portion 1, and skirts 2, adapted to embrace a section of the felly of the wheel, shown at A in Fig. 3, and project beyond the edges of the rim, shown at B. The body portion is cut away at its ends, forming semi-circular recesses 3, for engagement with the spokes of the wheel. A shoulder is formed on each side of the saddle, on one of which shoulders is formed a pair of ears 4, preferably by striking the same out from the metal of the skirt, to which ears are attached the ends of chains 5, which are designed to pass round the tire, indicated at C. The opposite ends of said chains are connected with hooks 6 on the ends of a frame 7, having a hinged connection with the saddle by means of a bar 8, held in sleeves 9 on the skirt 2 opposite to that on which the ears 4 are positioned. The sleeves 9 are also preferably formed by striking a portion of the metal of the skirt outwardly, and rolling the same into tubular form. The central part of the frame 7 is formed into a handle 10.

The frame 7 is preferably formed of a piece of wire of sufficient size and strength, and is shown as formed of a single piece of wire. When the chains are attached to the hooks 6, and the handle 10 turned inwardly across the felly, as shown in Fig. 3, the chains are drawn against the tire C, so as to encircle the same snugly. The shape of said handle is such as to make the same practically self-locking when in this position, the centrifugal force which is exerted when the wheel is in motion aiding in holding the same against release.

The edges of the recesses are formed with clips 11, possessing sufficient resiliency to cause the same to engage the spokes of the wheel closely, preventing the rattling of the saddle when in position.

It will be evident that the device can be easily and quickly placed in position on a wheel, when its use is required, or as quickly detached therefrom. One of the devices can be attached at the top of the wheel, and similar devices at the sides, without the necessity of turning the wheel.

Figure 4:
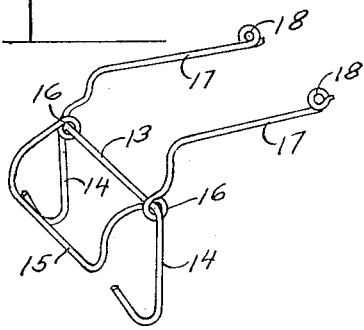
Fig. 4 is a detail of a modified form of catch, in perspective.

In Fig. 4 is shown another form of catch, in which a bar 13 is provided at its ends with hooks 14, and a frame 15 is hinged to the bar 13 by means of loops 16, and projected into a pair of handles 17, ending in rings 18. The bar 15 is the hinge rod of the catch, and such bar forms a bearng upon which the catch is rocked in tightening or releasing the chains, which are connected with the hooks 14.

It will be obvious that there is no danger of injury to the catch mechanism, for which the rim B forms a sufficient shield, in case the wheel enters a narrow opening.

What I claim, and desire to secure by Letters Patent, is:

1. In a device of the class described, a saddle-plate adapted for engagement with the felly of a motor-vehicle wheel, between two of the spokes thereof, provided at its ends with means for engagement with said spokes, and having side plates projected outwardly into engagement with the edges of the wheel rim, said side plates having shoulders for the support of chain fastening devices; ears struck out from the plate of one of said shoulders adapted to hold the ends of transverse tire chains; hinge devices struck out from the plate of the opposite shoulder; and a rocking frame held in said hinge devices, and provided with means for engagement with the opposite ends of said chains, the inward movement of said frame operating to hold such chains in place, when attached thereto.

2. In a device of the class described, embodying a saddle-plate and chains attached thereto at one of its sides, a frame comprising a bar forming a rocking bearing therefor, and terminating in a pair of chain-engaging devices, a cross-piece uniting said devices, and a handle projected from the central part of said cross-piece.

In testimony whereof I affix my signature.

JAMES STURM.